Dec. 27, 1960 R. H. WISE 2,966,077
MOTION-TRANSMITTING DEVICE
Filed May 9, 1956 3 Sheets-Sheet 1
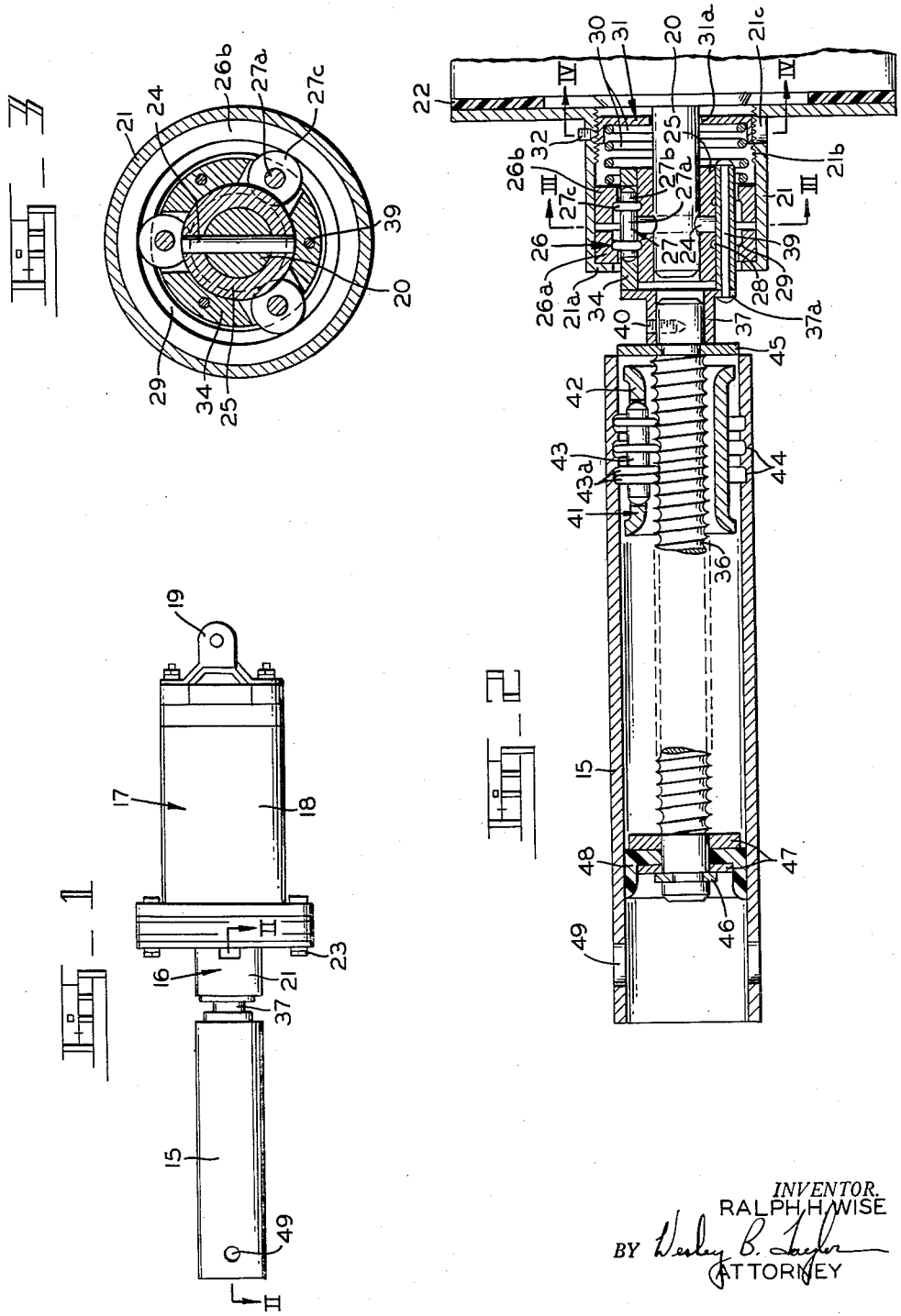
INVENTOR.
RALPH H. WISE
BY Wesley B. Taylor
ATTORNEY

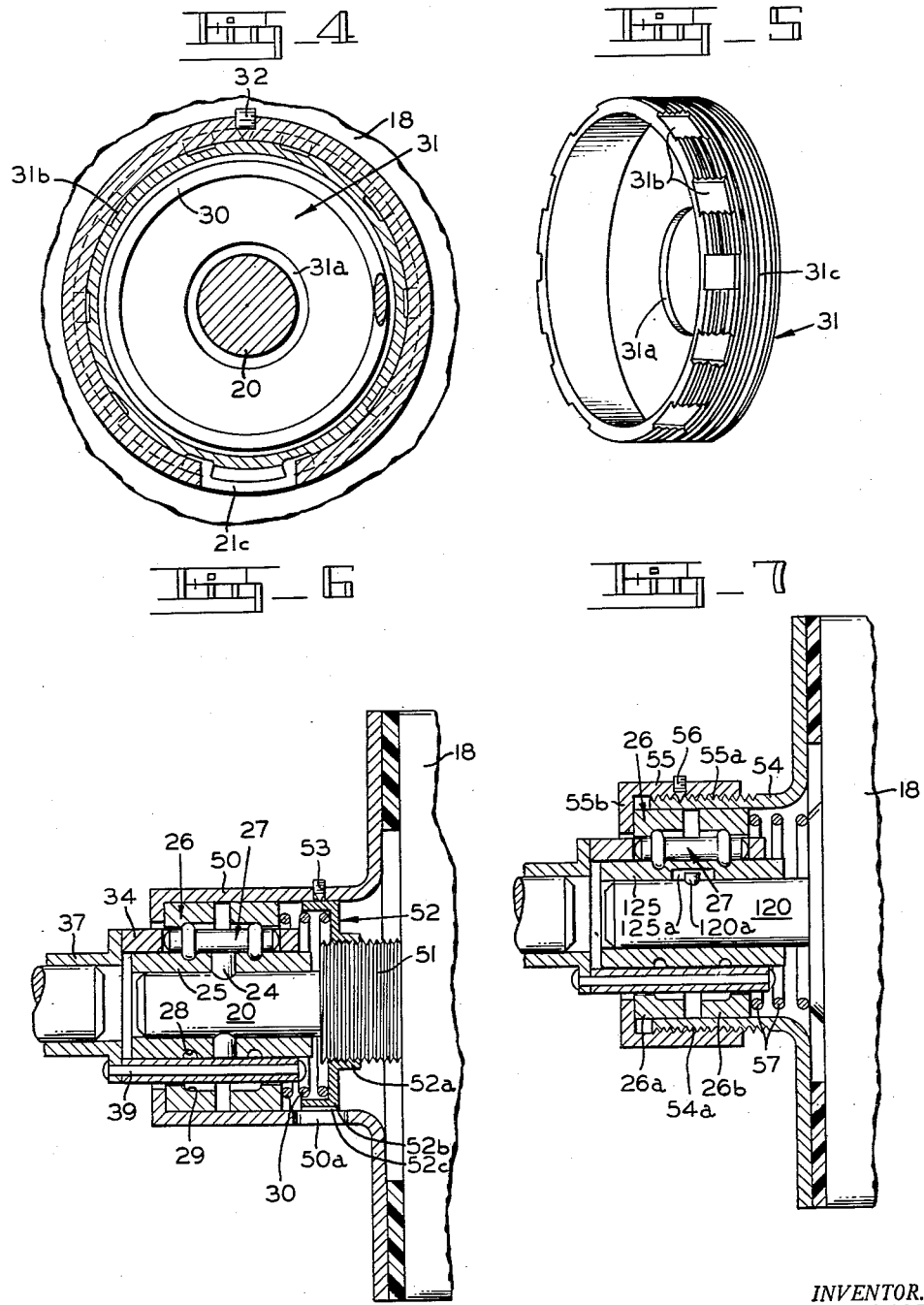

Dec. 27, 1960 R. H. WISE 2,966,077
MOTION-TRANSMITTING DEVICE
Filed May 9, 1956 3 Sheets-Sheet 3
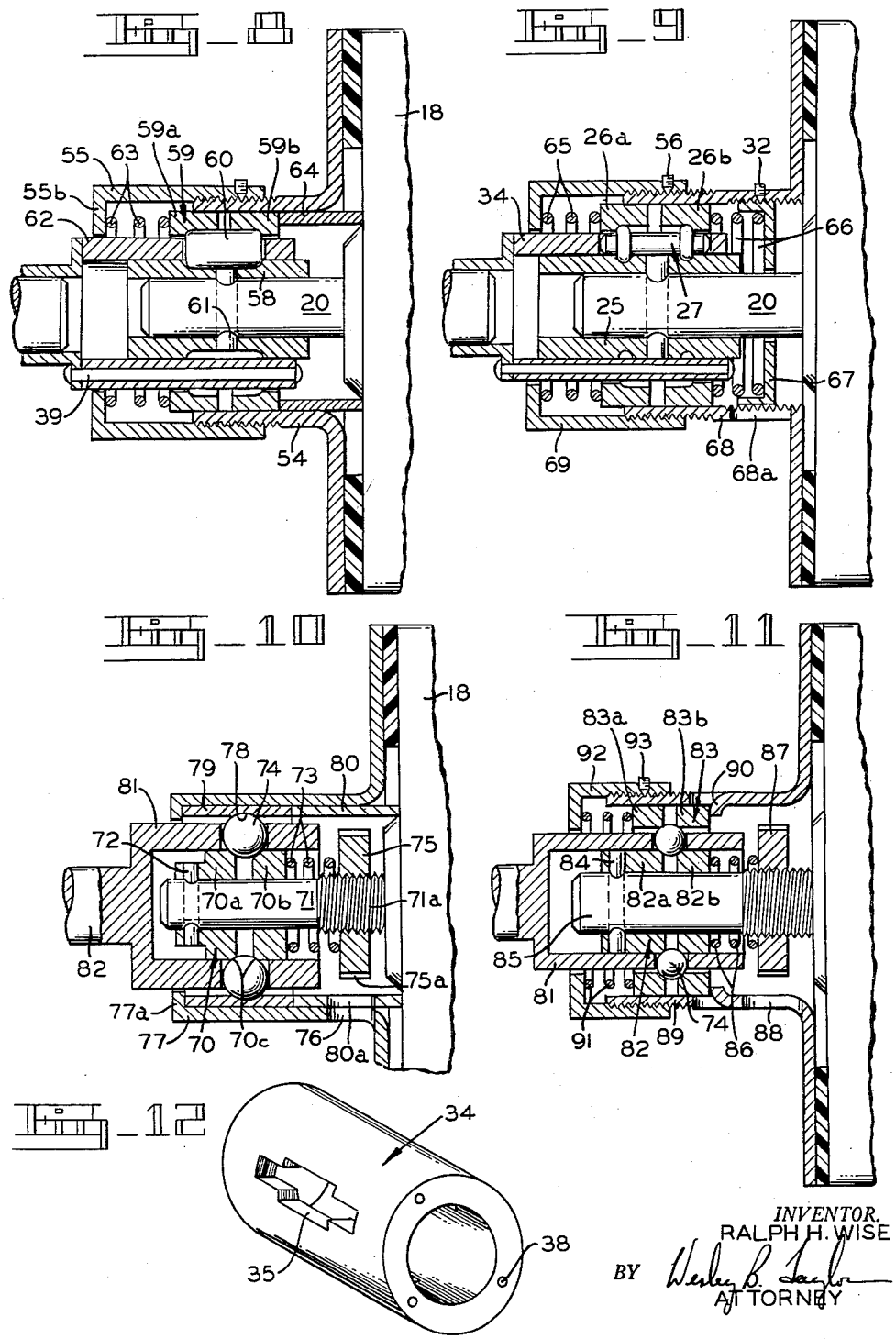
INVENTOR.
RALPH H. WISE
BY
ATTORNEY United States Patent Office 2,966,077
Patented Dec. 27, 1960

2,966,077
MOTION-TRANSMITTING DEVICE

Ralph H. Wise, Gary, Ind., assignor, by mesne assignments, to The Anderson Company, an Indiana corporation Filed May 9, 1956, Ser. No. 583,781

14 Claims. (Cl. 74—798)

The present invention relates to a device of improved construction for transmitting motion and, more particularly, to a motion-transmitting device wherein the driving and driven elements may in effect be disconnected from one another without damaging any part comprising the device when resistance to the corotation of the elements exceeds a predetermined amount.

This application is a continuation-in-part of an application entitled, "Motion-Transmitting Device," filed December 13, 1955, and assigned Serial No. 552,797, and an application entitled, "Motion-Transmitting Device, filed March 15, 1956, and assigned Serial No. 571,721, both now abandoned. As mentioned in this application, prior motion-transmitting devices are subject to wear over long periods of use because of the large bearing loads to which they are continually subjected. Some parts wear more quickly than others with the result that the component parts of the device become noisy and inefficient in operation.

In addition, prior motion-transmitting devices cannot successfully withstand resistance to corotation of the driving and driven elements beyond a certain degree. If the resistance is applied suddenly, as when the output element or member strikes a stop or otherwise freezes, the backlash damages the parts of the device and can even break an input element such as a shaft. Even if the resistance to corotation is gradually increased, a stalling point is eventually reached at which the resistance overcomes the driving force and the driving element is brought to rest. In those applications where the driving element is the shaft of or connected to an electric motor, even a gradual overcoming of the driving force can burn out the motor or inflict other damage.

Where prior motion-transmitting devices are used to convert rotary motion into translatory motion, still other problems are met. When, for example, the end of a translatory movement is reached, as by striking a stop, the output translatory element is often found to bind or otherwise become so impacted on the stop that it is not possible to retract the element back toward its starting point. As an instance, a threaded shaft may be rotated as by a motor to move a nut member on the threaded shaft in a translatory or axial direction thereof. When the nut member strikes a stop, particularly if the member rams against the stop in a sudden jarring impact, the nut member may become skewed on the shaft or otherwise bound on the shaft or the stop. When it is subsequently attempted to reverse the motor and rotate the threaded shaft in the opposite direction and thereby retract the nut member, it is often found that the motor lacks sufficient power to withdraw the member.

To avoid some of the foregoing problems, it has been suggested to allow the translatory element to rotate freely upon striking a stop or "freewheel" as it is termed here and in the claims. For instance, in the above example, the nut member can rotate freely or freewheel on the the threaded shaft after striking a stop in the manner illustrated in Patent No. 2,446,393 to Russell. However, in such construction there is freewheeling only when axial movement of the nut member along the threaded shaft is absolutely blocked. That is, there is no control on the minimum amount of resistance to corotation of the driving and driven elements which is necessary to initiate freewheeling.

Moreover, the freewheeling in prior structures takes place at the very extremity of the unit or when the translatory member has reached its outermost position. This means that the output shaft or driven member is continuously rotating even during periods of freewheeling or nonuse. Since the shaft may be of appreciable length, as when such a unit is used to raise and lower a window in a vehicle, this continuous rotation represents appreciable energy losses and causes an undesirable noise.

The present motion-transmitting device obviates all of the foregoing faults. In my device there is automatic compensation for wear so that the component parts are always maintained in proper alignment for more efficient and quiet operation. The driving and driven elements are designed to corotate until resistance to their corotation reaches a predetermined maximum when relative rotation or freewheeling begins. In this manner, the present structure avoids shocks and backlash to the input or driving element when the output or driven element is either gradually or suddenly stopped.

However, in the present invention the freewheeling does not take place at the outer extremity of the device but immediately adjacent the source of input power, so that the output element is at rest during periods of freewheeling or nonuse. Friction and power losses are accordingly reduced and the operation is more quiet. Moreover, with the present invention it is possible to vary the minimum resistance to corotation which is required to initiate freewheeling, or conversely, the maximum resistance to corotation at which the input and output elements can still corotate. Consequently, a single embodiment of the present invention can be adapted for an infinite number of uses in which it is desirable to have freewheeling commence at different resistances to corotation. In effect, there results a control on the point at which corotation between the driving and driven elements ends and relative rotation or freewheeling begins.

In one form the present motion-transmitting device embodies two telescoping relatively rotatable members at least one of which has a race. Rolling means operatively joins the two members and seats in the race. The latter is split radially so that the two parts engage the rolling means from opposite sides. Means, preferably of a resilient nature, urges the parts of the race into frictional engagement with the roller means and thereby maintains the various component parts of the device in position. The resilient means, therefore, automatically compensates for any wearing away of the parts. The continued pressure on the split race is transmitted through the roller means to other components of the device, such as the other part of the split race, so that the component parts are maintained in snug operating alignment. In this respect, the present invention also contemplates improved antifriction or bearing means, as will hereinafter become more apparent.

Preferably, the structure just described is adapted for motion transmitting by inserting a cage member between the two telescoping, relatively rotatable members and housing the roller means therein. Thus, as one of the two relatively rotatable members rotates and thereby defines an input or driving element, the rolling means planetates about the driving element to produce corotation of the cage member which thereby defines an output or driven element. Because of the individual rotation of the roller means, the angular rate of rotation between the driving and driven elements may be different. Accordingly, as used here and in the claims, the term "corotation" does not necessarily means the same rate of rotation. The cage member, representing the output element, may transmit the motion as rotary or translatory motion as hereinafter described.

In any case, the freewheeling in the present device does not take place between the output or driven element and an actuated part associated therewith. Instead, the freewheeling occurs directly between the driving and driven elements. More specifically, freewheeling starts when resistance to the corotation of the driving and driven elements exceeds the frictional force created by the urging of the resilient means of the split race against the roller means.

In my cited applications, Serial No. 552,797 and Serial No. 571,721, it is disclosed that the point at which corotation ends and freewheeling begins can be adjusted by changing the strength of the resilient means, such as a spring, which urges a split race against roller means. To accomplish this, it is necessary to have as many springs as there were different strengths contemplated, each spring varying from the other, and to disassemble and assemble the structure with a different spring each time a change in strength of the resilient means is desired. In the present invention, I incorporate adjusting means directly into the structure which can regulate the strength or compression of a single spring to meet a variety of performance demands.

As described and illustrated hereinafter, the adjustor means can be placed on either side of the race means and in cooperation with either an inner or outer split race or with both races when split to provide the desired adjusting action. In one form, the adjustor is an abutment member which engages the resilient means to effect the frictional engagement of the parts of the split race with the roller means. By positioning the abutment member at varying distances from the split race, the force by which the spring urges the split race into frictional engagement with the roller means can be regulated. The strength of this frictional engagement or contact controls the point at which the transition between corotation and freewheeling takes place.

The accompanying drawings illustrate a presently preferred embodiment wherein:

Figure 1 is a side view of a device embodying the present invention which is adapted for transmitting rotary motion into translatory motion or vice versa;

Figure 2 is a longitudinal section of Figure 1;

Figures 3 and 4 are sections of Figure 2 on the lines III—III and IV—IV, respectively;

Figure 5 is a perspective view of the adjustor means of Figure 4;

Figure 6 is a partial, longitudinal section of a modified structure of the present invention and illustrates a different mounting for the adjustor means;

Figures 7 and 8 are longitudinal sections similar to that of Figure 6 and show adjusting means located externally of a casing or housing, Figure 8 also embodying a different type of roller means;

Figure 9 is a longitudinal section also similar to that of Figure 6 and illustrates the use of dual springs or resilient means and an adjustor for each;

Figure 10 is a partial offset longitudinal section of a modified structure taken through the axes of another type of roller means which are spaced around the periphery of a shaft and shows adjusting means mounted with respect to a rotatable shaft for cooperation with a split inner race;

Figure 11 is a partial offset longitudinal section similar to that of Figure 10 and illustrates a structure having both races split and a spring and adjusting means for each race; and Figure 12 is a perspective view of a cage member which may be used in the embodiment of Figure 2.

In the present motion-transmitting device, the driving element may itself be driven by direct rotary motion or rotary motion induced by translatory motion as in thrusting a nut member axially along a threaded shaft. Similarly, the driven element of the present device may deliver either rotary or translatory motion. As disclosed herein, the invention is illustrated principally as receiving rotary motion and transmitting translatory motion. As such, the device has many applications such as raising and lowering a vehicle window, adjusting a seat of a vehicle, opening and closing a tailgate on a vehicle such as a station wagon, and other like applications.

Structure

Referring to the embodiment of Figures 1 through 5, a device of the type last mentioned includes a tubular member or rider 15 driven in a longitudinal direction by a motion-transmitting means generally indicated at 16 which is actuated by a power unit 17. The latter comprises a housing 18 adapted for pivotal or fixed connection to a suitable support through lugs 19. The housing contains a reversible motor (not shown) having a shaft 20 which represents the input or driving element of the motion transmitting means 16. A casing 21 encloses the shaft 20 and has a flange fixed to the housing 18 over a gasket 22 by bolts 23.

Suitable rolling means operatively connects the shaft 20 and casing 21. A pin or key 24 fixes an inner race 25 to the shaft. A telescoping outer race 26 is mounted within the casing 21 and split radially into two parts 26a and 26b. In this embodiment, three bearing elements 27 seat in the races and are equally spaced about the periphery of shaft 20. These bearing elements include a spindle or shaft portion 27a having trunnion ends 27b and radially enlarged bearing surfaces 27c, preferably of toroidal shape. As noted in my copending application, Serial No. 536,515, filed September 26, 1955, these bearing elements are preferred to other types of roller means, since for example the toroidal portions 27c support the shaft 20 against both axial thrust and radial load and can form substantially point-to-point contacts with the races. Race 25 has grooves 28 to receive the radially enlarged bearing surfaces 27c, and the separated parts 26a and 26b of the outer split race have inwardly directed grooves 29 for the same purpose. Race 26b has a running fit with respect to the casing 21, and race 26a preferably has a press fit against the casing.

Resilient means urges the parts 26a and 26b of the outer race together. In the form illustrated, a lip 21a of the casing prevents outward movement of part 26a away from the bearing elements 27. A coil spring 30 bears at one end against part 26b of the split race to urge this part into frictional engagement with the right-hand radially enlarged bearing surfaces of the elements 27 as viewed in Figure 2. At the other end, spring 30 engages an adjustor or abutment member 31 having an oversized aperture 31a to pass the shaft 20. A plurality of thrust-receiving areas or recesses 31b are stationed along the outer circumference of the adjustor 31. This circumferential area is also threaded as at 31c to mate with an internally threaded portion 21b of the casing. The latter has an opening 21c communicating with the recesses 31b to render them accessible therethrough, so that the adjustor 31 may be moved relatively to the casing 21 for effecting an adjusting action as hereinafter described. A set screw 32 passes through a threaded opening 33 in the casing to bear against the adjustor 31 and thereby lock the parts in a selected position. The force of the spring 30 is transmitted through the race part 26b, the bearing elements 27, and race part 26a to the casing lip 21a, so that the various components of the device are always maintained in desired alignment under the spring pressure.

The foregoing structure, representing in itself an improved antifriction or bearing means, is adapted for transmitting motion by inserting a tubular cage member 34 (Figure 12) between the races. The cage member may be made of brass or a polyamide resin such as nylon and has openings 35 to house the bearing elements 27. The openings are preferably of general cruciform shape or of reduced width at their ends to accommodate the trunnions 27b of the bearing elements.

It is emphasized that the cage member 34 defines the output or driven element of the motion-transmission device. To this end, the cage member may be secured to an externally threaded shaft 36 by means of a collar 37. The cage member 34 has longitudinally extending holes 38 which are interposed between the axially directed openings 35. Rivets 39 fit within the openings 38 to secure a flange 37a of the collar to an end of the cage member, and a set screw 40 holds the collar 37 to an unthreaded portion of the shaft 36.

A nut member travels the shaft 36 between stops thereon and is operatively associated with a rider member through which the translatory motion is ultimately transmitted. The nut member may comprise an ordinary internally threaded nut suitably held against rotation with the shaft as by the rider. Or the nut member may rotate with respect to the threaded shaft as hereinafter described in the instant embodiment.

In the present case, the nut member is generally indicated at 41 and the rider is the tubular member 15. The nut member 41 is disclosed and claimed in my cited copending application, Serial No. 536,515. It includes a second cage member 42 having openings to receive rotatable thrust and bearing elements 43 much like the first cage member 34 (note Figure 12). The elements 43 have spindle and trunnion portions like the elements 27, but the radially enlarged bearing surfaces 43a are four in number and unequally spaced along the spindle portion so as to insert two of the bearing surfaces 43a within one of a plurality of annular grooves 44 in the tubular member 15, as described in my cited copending application.

Stops 45 and 46 limit movement of the second cage member 41 axially of the threaded shaft 36. Stop 45 is a washer held in place between the collar 37 and the threaded portion of shaft 36. Stop 46 is a snap ring placed in a groove in the shaft 36 and confines a pair of radially extending plates 47 between the threaded portion of shaft 36 and the stop 46. A cup-shaped wear plate 48 is interposed between the plates 47 and may be formed of nylon or the like. The plate 48 guides the tubular member 15 with respect to the shaft 36 during the longitudinal translatory movement of such member. The free end of the tubular member 15 has a pair of radially opposed apertures 49 for attaching the member 15 to the part intended to receive the translatory motion.

Figures 6 through 11 illustrate some of the modifications that may be made in the present invention. Parts similar to those just described have the same reference numbers. In Figure 6 the adjusting means is maintained axially of the shaft 20 instead of a casing 50. More particularly, the housing 18 has an externally threaded boss 51. The adjustor is an annular disc 52 having oppositely turned flanges. Flange 52a extends along the boss and is threaded to mate therewith. Flange 52b parallels the casing 50 and preferably makes a sliding contact along the inner surface of the casing. An opening 50a in the casing exposes thrust-receiving areas or recesses 52c notched in the flange 52b, and a set screw 53 holds the disc 52 and casing 50 in a selective relative axial position.

In Figure 7 the adjusting means is located externally of a casing 54 and comprises a tubular member 55 having an internally threaded portion 55a to engage an externally threaded portion 54a of the casing 54. An inturned lip 55b of the member contacts part 26a of the split race. A set screw 56 maintains the tubular member 55 and casing 54 at any selected position within the combined axial extent of the threaded portions 54a and 55a. Spring 57 in this case bears at its right-hand end as viewed in Figure 7 against the housing 18. The force of the spring is delivered through the race part 26b, the bearing elements 27, and race part 26a to the lip 55b. The inner race 125 of this structure has a sliding fit on the shaft 120. In particular, the race 125 has a slot 125a, and the shaft 120 has a pin 120a which projects into the slot. This permits the race 125 to turn with the shaft 120 and yet accommodates relative axial movement between the race and shaft when it is desired to change the compression in the spring 57 by turning the member 55 about the casing 54.

Instead of the bearing elements 27, roller bearings may be used as shown in Figure 8. In this case an inner race 58 and an outer split race 59 have seats which conform to the shape of roller bearings 60. Race 58 may be fixed by a pin or key 61 to the shaft 20 through the bearing seat as shown. A cage member 62 is the same as before except that it has rectangular instead of cruciform openings to conform with the general perimetric outline of a roller bearing. In this respect it will be noted that it is not necessary for the bearing elements such as the bearings 60 to have pintles or shaft portions to journal their rotation. The structure of Figure 8 is otherwise similar to the structure of Figure 7, except that a coil spring 63 is interposed between the lip 55b of the casing 55 and a part 59a of the split race, rather than between the housing 18 and the parts 59b of the split race. A collar 64 spaces part 59b of the race away from the housing 18.

The structures of Figures 2 and 8 can, in effect, be combined as demonstrated in Figure 9. In this case, springs 65 and 66 engage parts 26a and 26b, respectively, of the split race and urge them into frictional engagement with the rotatable elements 27. An adjustor or abutment member 67 is mounted within a casing 68 to adjust the tension of spring 66 in the manner described for Figure 2, and a tubular member 69 telescoping the casing 68 operates similarly on spring 65 in the manner described for Figure 8. The casing has an opening 68a to reach the adjustor 67. This structure has the advantage of strengthening the driving connection and requiring a greater back force or resistance to corotation before freewheeling can take place, inasmuch as both parts of the split race are directly urged into frictional engagement with the bearing means by separate springs.

The embodiments previously described have employed an outer split race. However, as exemplified by Figure 10, the inner race may be the split race. In this instance, an inner race 70 is split and has one part 70a fixed to a shaft 71 by a pin 72. The other part 70b of the split race is movable along the shaft 71. A coil spring 73 bears at one end against the part 70b to force it into frictional engagement with bearing elements 74 and bears at the other end against a ring-shaped adjustor 75 which makes a substantially tight threaded engagement with a threaded portion 71a of the shaft. The adjustor 75 also has thrust-receiving areas or notches 75a which are accessible through an opening 76 in a casing 77 in order to permit movement of the adjustor 75 relatively to the shaft 71. This embodiment also illustrates that the bearing elements 74 may be ball bearings. The parts of the split race 70 cooperate to define a groove 70c which cooperates with a groove 78 of an outer race 79 to receive the ball bearings 74. A collar 80 spaces the outer race 79 away from the housing 18 and against the lip 77a of the casing in proper radial alignment with the inner race 70. Collar 80 also has an opening 80a aligned with the opening 76 of the casing. A cage member 81 is similar in construction to that shown in Figure 12, except that openings conforming more to the peripheral shape of a ball bearing may be used and made integral with an output shaft 82.

Figure 11 illustrates further modifications wherein both races may be split with the parts thereof urged together by resilient means, the latter taking the form of separate springs, and wherein an adjustor is used for each spring. Thus, the structures of Figures 8 and 10 can, in effect, be combined. The resulting structure has the advantage of further strengthening the driving connection between the driving and driven elements, as in the case of the structure of Figure 9, inasmuch as both races are urged into frictional engagement with the bearing means. In Figure 11 both an inner race 82 and an outer race 83 are radially split. A pin 84 holds part 82a of the inner race in fixed relation to a shaft 85, and a spring 86 urges part 82b toward part 82a and into frictional engagement with ball bearings 74. A ring-shaped adjustor 87 varies the tension in spring 86 in the manner described for Figure 10 and is reached through an opening 88 in a casing 89. A plurality of inturned detents 90 struck from the body of the casing prevents movement of part 83b of the outer split race away from the bearing elements, while a spring 91 bearing on part 83a urges the parts of the outer split race together. The strength of spring 91 is regulated by a tubular member 92 which may be locked in place by a set screw 93 as in the case of Figure 8.

*Operation*

Referring to the embodiment of Figures 1 through 5, as the shaft 20 rotates, the bearing elements 27 or their equivalent planetate thereabout. Since the elements 27 rotate between the races 25 and 26 on their own axes, their rate of revolution about the shaft 20 is less than the rate of rotation of the shaft, the difference providing a mechanical advantage. Planetation of the elements 27 about the shaft 20 causes corotation of the cage member 34 and the threaded shaft 36 with the shaft 20. If the nut member 41 of Figure 2 is used, the bearing elements 43 planetate about the shaft 36 as the latter rotates, and like the elements 27, the elements 43 so planetate at a rate slower than the rate of revolution of the shaft 36. This provides an additional mechanical advantage. As the elements 43 move axially of the shaft 36, the enlarged radial portions 43a engage the grooves 44 of the member 15 and thereby translate this member or rider.

During this time, spring 30 forces race part 26b against the bearing elements 27 with a predetermined force established by the strength of the spring. Corotation between the shaft 20 and the cage member 34 or threaded shaft 36 continues as long as the resistance to such corotation is less than the frictional grip of the race 26 on the bearing elements 27. When this resistance exceeds the frictional grip, as when the second cage member 42 strikes stop 46 or the plates 47 held in place by stop 46, the driving connection is broken and freewheeling begins. The threaded shaft 36 and cage member 34 come to a complete stop, while the shaft 20 continues to rotate uninterruptedly. During freewheeling, the bearing elements 27 may simply rotate on their own axes or slide on the shaft 20 without planetating thereabout.

At any time the point at which corotation stops and freewheeling begins can be adjusted by changing the strength of the spring 30 or the force or intensity by which it urges the parts of the split race into frictional engagement with the bearing elements 27 and thereby also regulate the magnitude of such frictional engagement. In the present invention, this is readily accomplished by rotating the adjustor or abutment member 31 relatively to the casing 21 to move the adjustor axially of the casing and thereby vary the compression or force stored in the spring 30. In practice, the set screw 32 is loosened and a tool such as a screw driver is passed through the opening 21c of the casing and thrust against an area or recess 31b to move the adjustor 31 as indicated, after which the set screw 32 may again be tightened. The annular disc 52 of Figure 6 and the ring-shaped adjustors 75 and 87 of Figures 10 and 11 are similarly positioned axially of the boss 51 or shafts 71 or 85, respectively, to vary the compression on springs 30, 73, or 86. In a like manner the tubular members 55, 69, and 92 of Figures 7, 8, 9, and 11 occupy a preselected telescoping position about the casings associated therewith to vary the force of the springs as desired.

The reverse of the action just described is possible, that is, translatory motion can be transmitted as rotary motion. For example, by providing the shaft 36 with threads of appreciable lead, the rider or tubular member 15 can be translated axially along the shaft to cause its rotation. This rotation can be delivered through the motion-transmitting means 16 to the shaft 20 from which the motion can be ultimately delivered either as rotary or translatory in a manner just described. For instance, shaft 20 could have an extended threaded portion (not shown) which is equipped with a nut member as shaft 36 is in Figure 2. Additionally, input rotary motion can be transmitted as rotary motion. For example, a pulley can be fixed to the shaft 20 as disclosed in my cited copending application, Serial 552,797, so that the rotated shaft 20 may deliver rotary motion as well. In such a case the advantages of the invention are still retained. A drive belt on such a pulley can be safely stopped, accidentally or otherwise, without damage to the motion-transmitting device, since freewheeling between the shaft 20 and the cage member 34 automatically takes place.

Although the foregoing disclosure describes a presently preferred embodiment and modifications thereof, it is understood that the invention may be practiced in still other forms within the scope of the following claims.

I claim:

1. A motion-transmitting device adapted for freewheeling between input and output elements comprising a rotatable shaft defining one of said elements, a casing stationed about and spaced from the shaft, a radially split race on the shaft, a second radially split race mounted within the casing and substantially radially opposing the first race, roller means simultaneously seating in both of said split races, stop means on the shaft and casing, respectively, for limiting movement of one of the parts of each of the split races away from the roller means, a spring engaging each of the remaining parts of each race for urging said part toward its companion part and into frictional engagement with the roller means, adjustor means for each of the springs, the adjustor means for the spring of the first race comprising a ring-shaped abutment member having thrust-receiving areas along its exterior and being substantially concentric with the shaft, the shaft having a threaded portion for receiving a like portion of the abutment member for relative axial movement, said ring-shaped abutment member engaging and arresting axial travel of the spring of the first race away from the roller means, said casing having an opening communicating with the thrust-receiving areas to render said areas accessible therethrough and enable the ring-shaped member to be moved axially of the shaft, the adjustor means for the spring of the second race comprising a second abutment member encircling the casing and engaging and arresting axial travel of the spring of the second race away from the roller means, and means for stationing the first and second abutment members at selected positions axially of the shaft and casing, respectively, for varying the compression of each spring and controlling the degree of said frictional engagement.

2. A motion-transmitting device adapted for freewheeling between input and output elements including a rotatable shaft defining one of said elements, a casing about the shaft and fixed relative thereto, a radially split race on the shaft, one part of said race being fixed to the shaft and the other part of said race being movable along the shaft, a second radially split race mounted within the casing and substantially encircling the first race, a stop on the casing limiting the outward movement of one part of the second race, roller means simultaneously seating in both of said split races, a cage member positioned between the races and having apertures for housing the roller means and defining the other of said elements, and resilient means within the casing urging each of the parts of the split races into frictional engagement with the roller means for effecting a driving connection between said input and output elements when resistance to their corotation is less than the frictional engagement provided by said resilient means and for allowing a freewheeling action between said elements when said resistance is greater than said frictional engagement.

3. A motion-transmitting device adapted for freewheeling between input and output elements comprising a rotatable shaft defining one of said elements, a casing about the shaft, a radially split race on the shaft, the parts of said race being movable along the shaft, a second radially split race mounted within the casing and placed substantially in radial alignment with the first race, the parts of the second race being movable axially of the casing, roller means simultaneously seating in both of said split races, a cage member positioned between the races having apertures for housing the roller means and defining the other of said elements, and resilient means within the casing urging each of the parts of each of the split races into frictional engagement with the roller means for effecting a driving connection between said input and output elements when resistance to their corotation is less than the frictional engagement provided by said resilient means and for allowing a freewheeling action between said elements when said resistance is greater than said frictional engagement.

4. A motion-transmitting device comprising a rotatable shaft, a casing about the shaft, an inner race on the shaft, an outer race on the casing overlapping the inner race, roller means simultaneously engaging both races for operatively connecting the races for relative rotary movement, a cage member positioned between the races and housing the roller means, one of said races comprising separated parts spaced axially on opposite sides of the roller means for engagement therewith, means for urging one of the separated parts into frictional engagement with the roller means, said urging means comprising a spring engaging one of the separated parts for urging said part into said frictional engagement with the roller means, and adjustor means for varying the magnitude of said frictional engagement, said adjustor means comprising an abutment member engageable with the spring and adapted to be stationed axially of the shaft for varying the intensity of the urging of said part into said frictional engagement, the foregoing elements being so constructed and arranged that a driving connection is formed between the rotatable shaft and the cage member when resistance to their corotation is less than the frictional engagement between said one of the separated parts and the roller means and a freewheeling connection is formed between the shaft and the cage member when resistance to said corotation is greater than said frictional engagement.

5. A motion-transmitting device comprising a rotatable shaft, a casing about the shaft, an inner race on the shaft, an outer race on the casing overlapping the inner race, roller means simultaneously engaging both races for operatively connecting the races for relative rotary movement, a cage member positioned between the races and housing the roller means, one of said races comprising separated parts spaced axially on opposite sides of the roller means for engagement therewith, means for urging one of the separated parts into frictional engagement with the roller means, said urging means comprising a spring engaging one of the separated parts for effecting said frictional engagement with the roller means and adjustor means for varying the magnitude of said frictional engagement, said adjustor means comprising an abutment member engageable with the spring, said abutment member being mounted within the casing for axial movement thereof for varying the magnitude of the urging of said part into said frictional engagement, the foregoing elements being so constructed and arranged that a driving connection is formed between the rotatable shaft and the cage member when resistance to their corotation is less than the frictional engagement between said one of the separated parts and the roller means and a freewheeling connection is formed between the shaft and the cage member when resistance to said corotation is greater than said frictional engagement.

6. A motion-transmitting device as claimed in claim 5 wherein the abutment member and casing have mating threaded portions to permit relative rotary motion therebetween, said abutment member has thrust-receiving areas, said casing has an opening communicating with the thrust-receiving areas to render said areas accessible therethrough for effecting said relative rotary motion.

7. A motion-transmitting device as claimed in claim 5 wherein the abutment member is annular to receive the shaft freely therethrough, the abutment member and casing have mating threaded portions to permit relative rotary motion therebetween, said abutment member has peripheral recesses, said casing has an opening communicating with the recesses to render said areas accessible therethrough for effecting said relative rotary motion, and means for locking the abutment member and casing at selected relative axial positions.

8. A motion-transmitting device comprising a rotatable shaft, a casing about the shaft, an inner race on the shaft, an outer race on the casing overlapping the inner race, roller means simultaneously engaging both races for operatively connecting the races for relative rotary movement, a cage member positioned between the races and housing the roller means, said outer race comprising separated parts spaced axially on opposite sides of the roller means for engagement therewith, coil spring means engaging one of said separated parts for urging said separated parts into frictional engagement with the roller means, adjustor means for varying the magnitude of said frictional engagement, said adjustor means comprising a tubular member stationed about the shaft and having a threaded periphery, and an annular abutment member engaging the coil spring, said abutment member having thrust-receiving areas along its outer circumference and contacting said threaded periphery for relative rotary movement therewith, said casing having an opening communicating with the thrust-receiving areas to render said areas accessible therethrough and effect said relative rotary motion whereby the magnitude of the urging of said separable part into said frictional engagement is altered, the foregoing elements being so constructed and arranged that a driving connection is formed between the rotatable shaft and the cage member when resistance to their corotation is less than the frictional engagement between said one of the separated parts and the roller means and a freewheeling connection is formed between the shaft and the cage member when resistance to said corotation is greater than said frictional engagement.

9. A motion-transmitting device comprising a rotatable shaft, a casing about the shaft, an inner race on the shaft, an outer race on the casing overlapping the inner race, roller means simultaneously engaging both races for operatively connecting the races for relative rotary movement, a cage member positioned between the races and housing the roller means, said outer race comprising separated parts spaced axially on opposite sides of the roller means for engagement therewith, coil spring means engaging one of the separated parts for urging the separated parts into frictional engagement with the roller means, adjustor means for varying the magnitude of said frictional engagement, said adjustor means comprising an abutment member engaging the other separable part and encircling the casing, and means for stationing the abutment member and casing at selected encircling positions for varying the compression of the coil spring and thereby varying the degree of said frictional engagement, the foregoing elements being so constructed and arranged that a driving connection is formed between the rotatable shaft and the cage member when resistance to their corotation is less than the frictional engagement between said one of the separated parts and the roller means and a freewheeling connection is formed between the shaft and the cage member when resistance to said corotation is greater than said frictional engagement.

10. A motion-transmitting device comprising a rotatable shaft, a casing about the shaft, an inner race on the shaft, an outer race on the casing overlapping the inner race, roller means simultaneously engaging both races for operatively connecting the races for relative rotary movement, a cage member positioned between the races and housing the roller means, said outer race comprising separated parts spaced axially on opposite sides of the roller means for engagement therewith, coil spring means engaging one of said separated parts for urging said separated parts into frictional engagement with the roller means, adjustor means to vary the magnitude of said frictional engagement, said adjustor means comprising an abutment member engaging the spring and encircling the casing, and means for stationing the abutment member and casing at selected encircling positions for varying the compression of the coil spring and thereby varying the degree of said frictional engagement, the foregoing elements being so constructed and arranged that a driving connection is formed between the rotatable shaft and the cage member when resistance to their corotation is less than the frictional engagement between said one of the separated parts and the roller means and a freewheeling connection is formed between the shaft and the cage member when resistance to said corotation is greater than said frictional engagement.

11. A motion-transmitting device comprising a rotatable shaft, a casing about the shaft, an inner race on the shaft, an outer race on the casing overlapping the inner race, roller means simultaneously engaging both races for operatively connecting the races for relative rotary movement, a cage member positioned between the races and housing the roller means, said outer race comprising separated parts spaced axially on opposite sides of the roller means for engagement therewith, spring means engaging each of said separable parts for urging said separated parts into frictional engagement with the roller means, adjustor means for varying the magnitude of said frictional engagement, said adjustor means comprising a first abutment member engaging one of the spring means and mounted within the casing for axial movement thereof, a second abutment member encircling the casing and engaging another of said spring means, and means for stationing the abutment members at selected axial and telescoping positions, respectively, for regulating the magnitude of the force by which each spring means thrusts the separable parts into said frictional engagement, the foregoing elements being so constructed and arranged that a driving connection is formed between the rotatable shaft and the cage member when resistance to their corotation is less than the frictional engagement between said one of the separated parts and the roller means and a freewheeling connection is formed between the shaft and the cage member when resistance to said corotation is greater than said frictional engagement.

12. A motion-transmitting device comprising a rotatable shaft, a casing about the shaft, an inner race on the shaft, an outer race on the casing overlapping the inner race, roller means simultaneously engaging both races for operatively connecting the races for relative rotary movement, a cage member positioned between the races and housing the roller means, one of said races comprising separated parts spaced axially of the rotatable shaft in engagement with said roller means, resilient means positioned axially of the shaft in engagement with said separated parts for urging said parts into frictional engagement with said roller means, and adjustor means for varying the magnitude of said frictional engagement, said adjustor means comprising an abutment member engageable with the resilient means and adapted to be stationed axially of the shaft for varying the intensity of the urging of said parts into said frictional engagement, the foregoing elements being so constructed and arranged that a driving connection is formed between the rotatable shaft and the cage member when resistance to their corotation is less than the frictional engagement between said one of the separated parts and the roller means and a freewheeling connection is formed between the shaft and the cage member when resistance to said corotation is greater than said frictional engagement.

13. A motion-transmitting device for converting rotary motion into translatory motion comprising a rotatable shaft defining an input rotary element, a casing about the shaft, an inner race on the shaft, an outer race on the casing substantially encircling the inner race, roller means simultaneously engaging both races for operatively connecting the races for relative rotary movement, a cage member positioned between the races and housing the roller means, said cage member extending outwardly from the races and terminating in an externally threaded screw portion, a nut member engaging the screw portion for axial travel therealong, a rider operatively connected with the nut member and thereby also adapted for axial travel along the screw portion, said rider defining an output translatory element adapted for connection with a member for imparting translatory motion thereto, one of said races comprising separated parts spaced axially of the rotatable shaft and on opposite sides of the roller means for engagement therewith, means stationed axially of the shaft and on opposite sides of the race having the separated parts for urging said parts into frictional engagement with the roller means, and adjustor means for varying the magnitude of said frictional engagement comprising an abutment member engageable with the resilient means for varying the intensity of the urging of said separated parts into said frictional engagement, the separated race and the roller means being so constructed and arranged that a driving connection is formed between the rotatable shaft and the cage member when resistance to their corotation is less than the frictional engagement between said separated parts and the roller means and a freewheeling connection is formed between the shaft and cage member when resistance to said corotation is greater than said frictional engagement.

14. A motion-transmitting device for converting rotary motion into translatory motion comprising a rotatable shaft defining an input rotary element, a casing about the shaft, an inner race on the shaft, an outer race on the casing substantially encircling the inner race, roller means simultaneously engaging both races for operatively connecting the races for relative rotary movement, a cage member positioned between the races and housing the roller means, said cage member extending outwardly from the races and terminating in an externally threaded screw portion, a nut member engaging the screw portion for axial travel therealong, a rider operatively connected with the nut member and thereby also adapted for axial travel along the screw portion, said rider defining an output translatory element adapted for connection with a member for imparting translatory motion thereto, one of said races comprising separated parts spaced axially of the rotatable shaft in engagement with said roller means, and resilient means positioned axially of the shaft in engagement with said separated parts for urging said parts into frictional engagement with the roller means, the separated race and the roller means being so constructed and arranged that a driving connection is formed between the rotatable shaft and the cage member when resistance to their corotation is less than the frictional engagement between said separated parts and the roller means and a freewheeling connection is formed between the shaft and cage member when resistance to said corotation is greater than said frictional engagement.

References Cited in the file of this patent

UNITED STATES PATENTS

| | | |
|---|---|---|
| 1,585,140 | Erban | May 8, 1926 |
| 1,713,194 | Ross | May 14, 1929 |
| 1,737,997 | Gerrard | Dec. 3, 1929 |
| 1,991,846 | Cramer | Feb. 19, 1935 |
| 2,192,084 | Kamenarovic | Feb. 27, 1940 |
| 2,806,690 | Miles | Sept. 17, 1957 |

FOREIGN PATENTS

| | | |
|---|---|---|
| 692,431 | France | Nov. 5, 1930 |
| 820,842 | France | Nov. 19, 1937 |
| 971,564 | France | Jan. 18, 1951 |